(12) United States Patent
Eskildsen et al.

(10) Patent No.: US 6,192,879 B1
(45) Date of Patent: Feb. 27, 2001

(54) GAS HOB

(75) Inventors: Christian Eskildsen, Gelsted (DK); Pelle Östlund, Solna (SE)

(73) Assignee: Aktiebolaget Electrolux, Stockholm (SE)

(*) Notice: Subject to any disclaimer, the term of this patent is extended or adjusted under 35 U.S.C. 154(b) by 0 days.

(21) Appl. No.: 09/202,341

(22) PCT Filed: Jun. 16, 1997

(86) PCT No.: PCT/DK97/00259

§ 371 Date: Aug. 13, 1999

§ 102(e) Date: Aug. 13, 1999

(87) PCT Pub. No.: WO97/47927

PCT Pub. Date: Dec. 18, 1997

(30) Foreign Application Priority Data

Jun. 14, 1996 (DK) .................................................. 0662/96

(51) Int. Cl.$^7$ .................................................... F24C 15/10
(52) U.S. Cl. .................................. 126/214 R; 126/39 N; 126/39 K; 126/214 C
(58) Field of Search .............................. 126/39 H, 39 N, 126/39 J, 39 K, 39 R, 214 R, 214 A, 40, 39 B, 211, 217, 215, 214 C, 212

(56) References Cited

U.S. PATENT DOCUMENTS

| 670,740 | * | 3/1901 | Sheppart | 126/39 H |
| 3,592,180 | * | 7/1971 | Kweller et al. | 126/214 |
| 5,342,192 | * | 8/1994 | Hirano | 126/39 H |
| 5,408,984 | | 4/1995 | Maughan | 126/39 E |
| 5,425,353 | * | 6/1995 | Herbert | 126/39 H |

FOREIGN PATENT DOCUMENTS

| 2228565 | 8/1990 | (GB) . |
| WO 97/1131 A1 | * 3/1997 | (WO) . |

* cited by examiner

Primary Examiner—Ira S. Lazarus
Assistant Examiner—Josiah C. Cocks
(74) Attorney, Agent, or Firm—Pearne & Gordon LLP

(57) ABSTRACT

A traditional gas burner for a hob is centrally located below a support grille and surrounded by a dish-shaped depression for spillage. Control of the power of the burner is usually only by the control of the total gas supply, even though the burner provides a large number of small flames. The invention provides efficient means of controlling each individual flame (F1a–F4a, F1b–F4b) via individual pipes to orifices, and the required space for this is provided by directing the flames from the outside and towards the center of the cooking vessel. The orifices are placed in the sides of channels providing air supply and exhaust of burnt gases. The channels are formed in what is otherwise a large flat top (A1–A9) of the hob.

4 Claims, 2 Drawing Sheets

GAS HOB

The invention relates to a gas hob comprising support means for a cooking vessel and flame orifices.

Gas hobs using direct flame contact to the cooking vessel are traditionally disposed with a central flame generating burner and support means for the cooking vessels which may take the shape of centrally pointing metal struts or a grid made of heavy gauge metal wire. Below the burner and the support means there is frequently disposed a dish-shaped depression to collect any food which escapes the cooking vessel during the cooking. The traditional method for controlling the heat generation of the flame is by controlling the amount of gas that is fed to the burner, the gas being supplied at a velocity such that the required air is drawn in to be mixed with the gas. The mixture is ejected radially outwards from the central burner where it burns, either as individual flames from orifices or as a sheet of flame. It has turned out that a larger range of adjustment would be desirable, and it could be considered to control the gas supply to orifices individually. However, in a central burner this is difficult and requires fairly long gas or gas/air mixture lines from the valves to the burner.

According to the invention this problem may be solved by literally turning the burner/hob construction inside-out. This is done in a gas hob according to the invention which is particular in that the support means for the cooking vessel contain orifices for gas flames which point inwards towards the center of the cooking vessel.

An advantageous embodiment of the invention is obtained when the support means for the cooking vessel have a flat top surface which form part of the general top surface of the hob, said surface having deep channels forming air and exchaust passages for the flames. This means that a range of cooking vessels may be slid across the surface while being at all times supported to ensure against toppling, A further advantageous embodiment is particular in that each channel is deepest below the location of the cooking vessel when in use. This ensures that spillage will collect at the bottom of the channel from where it may be removed.

A further advantageous embodiment is particular in that each inwards pointing orfice is individually supplied with gas controlled via a valve arrangement located in the hob. This constitutes an efficient use of the space below the top surface of the hob which apart from the channels for the exhaust and for collecting spills is available for valves and gas lines as well as for control arrangements.

A further advantageous embodiment of the invention will be realized when the entire top part of the hob is made of an insulating, in particular ceramic or vitro-ceramic material. This means that electronic devices may be used to determine the presence and properties of a cooking vessel, such as electromagnetic devices, which will not have most of the effect short-circuited by conductive material near the cooking vessel.

Figure 1:
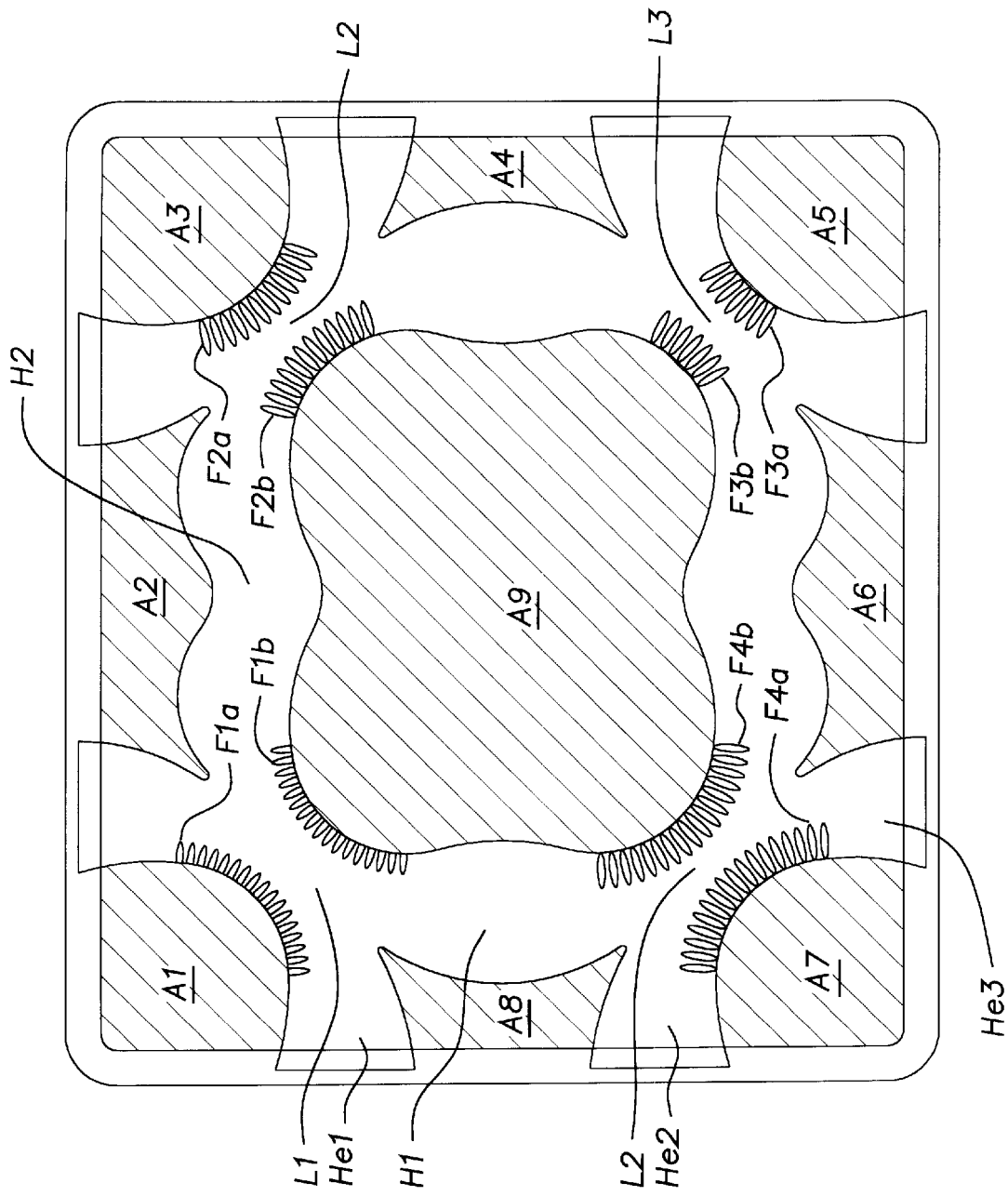
Figure 2:
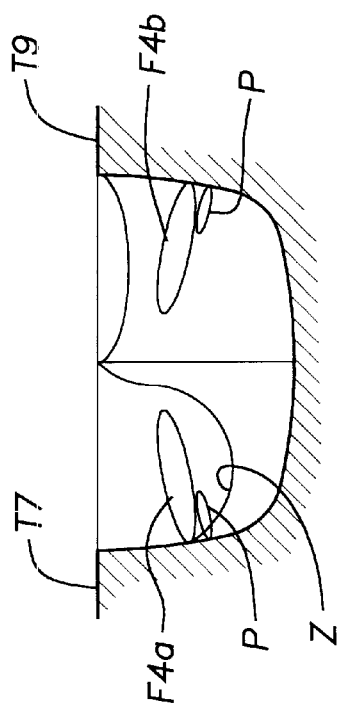
Figure 3:
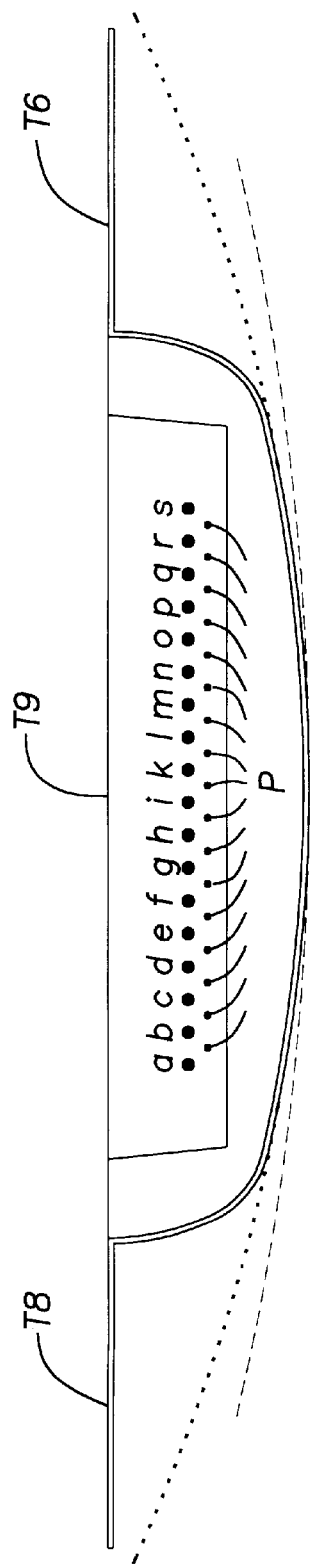

The invention will be described in greater detail in the following with reference to the drawings in which FIG. 1 shows a hob according to the invention with four principal heating locations, FIG. 2 shows a view in a channel, and FIG. 3 shows a set of orifices for flames.

In FIG. 1 the top surface of the hob is shown divided into 9 areas A1–A9 which are all flush and which are able to support a cooking vessel in such a way that it may be slid along the surface. The areas are separated by a series of connected channels which form passages for air to the flames and for the exhaust created by the combustion of the gas. These channels have a very different depth at various places on the hob, in that there are four places L1–L4 where the level is lowest, and a number of higher places, such as H1, H2. The channels also rise towards the edges of the hob, such as at He1, He2, and He3. The depressions L1–L4 correspond to 4 principal heating locations for cooking vessels and serve to contain spillage from the cooking vessels. The transition between the high parts and the low parts occurs with gradual slopes. In the present embodiment the sides of the channels are essentially vertical.

The four heating locations are supplied with double sets of flame orifices F1a–F1b, F2a–F2b, F3a–F3b, F4a–F4b. The flames are directed from the volumes below the top surface and towards each other or in other words from the outside towards the center of a cooking vessel placed on the heating location. The orifices are placed at a level below the top surface but sufficiently above the maximum depth of the depressions L1–L4 in order that spillage will not extinguish the flames in normal use.

The amount of heat generated at a heating location is determined by the length of the flames as well as by their number. In traditional hobs, because of the central placement under each heating location there is very little space to feed individual gas lines to each orifice, however the volumes below the surfaces A1, A3, A5, A7, and A9 are sufficient for an efficient and simple construction. This means that not only may the general gas supply to a heating location be controlled, but a selection of the active orifices may be performed. This means, for instance, that a more even heating of a cooking vessel at low power supply may be obtained at the heating location between A1 and A9 (F1a–F1b) as compared to the heating location between A5 and A9 (F3a–F3b). This latter would be used predominantly for small pots.

The control of flames would in many cases occur by reducing the supply of gas to a heating location, but cutting out orifices from the outside, such as in F3a–F3b as compared to F2a–F2b. However, in order to obtain greater evenness, it may be preferable to cut out every other orifice instead, in order to distribute the reduction in power evenly.

In FIG. 2 is a view in a channel, looking from A6 in the direction of A8, and it shows the channel at the deepest place L2, with the flames F4a and F4b projecting from the volumes below A7 and A9. The top surface of the hob is indicated by T7 belonging to the area A7 as shown in FIG. 1, and T9 belonging to the area A9. The curve Z shows the division of the channels towards the high level at H1 to the right and towards the high level at He2 which is to the left in the figure. It will be seen that each major flame has a pilot flame associated with it.

In FIG. 3 a set of orifices is shown, identified from left to right as a, b, c, . . . r, s, corresponding to the set of flames F4b in FIGS. 1 and 2. These may be controlled, either completely individually or in combination, thereby controlling the heating precisely. For instance, the center orifices g, h, i, k, l may be given less gas (and their opposites in the group F4a) in order to create a very even hot environment below a pot. In order to reduce the power output of this heating location, orifices may be cut off by reducing gas supply in pairs, such as a-s, b-r, c-q, d-p, e-o, etc. However, greater evenness of reduction would be obtained when halving the output when only a, c, e, g, i, l, n, p, and r remain lit and the others extinguish. Below the line of orifices a line at pilot flames P may be seen. These serve to quickly re-light any orifices when they are re-supplied with gas or in case a draft has blown a flame out. The top surface of the hob is seen as T8 corresponding to the area A8 in FIG. 1, and T6 corresponding to area A6.

What is claimed is:

1. A gas hob comprising support means for a cooking vessel or vessels and flame orifices, characterized in that the support means for the cooking vessel or vessels contain at least two sets of orifices for gas flames which point inwards towards each other and towards the center of the cooking vessel, said sets of orifices being respectively located in opposed relation on opposite sides of a longitudinal channel extending from one edge of said support means to another edge.

2. A gas hob according to claim 1, characterized in that the support means for the cooking vessel have a flat top surface which form part of the general top surface of the hob, said channel forming air and exhaust passages for the flames.

3. A gas hob according to claim 2, characterized in that said channel is of varying depth and is deepest below the location of the cooking vessel when in use.

4. A gas hob according to claim 2, characterized in that the entire top part of the hob is made of an insulating, in particular ceramic or vitro-ceramic material.

* * * * *